(12) United States Patent
Low et al.

(10) Patent No.: US 7,499,098 B2
(45) Date of Patent: Mar. 3, 2009

(54) METHOD AND APPARATUS FOR DETERMINING THE STATUS OF FRAME DATA TRANSMISSION FROM AN IMAGING DEVICE

(75) Inventors: Yun Shon Low, Richmond (CA); Raymond Chow, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 651 days.

(21) Appl. No.: 11/146,643

(22) Filed: Jun. 7, 2005

(65) Prior Publication Data

US 2006/0274152 A1 Dec. 7, 2006

(51) Int. Cl.
*H04N 5/222* (2006.01)

(52) U.S. Cl. .................................. 348/371; 348/207.99

(58) Field of Classification Search .............. 348/207.1, 348/222.1, 333.11, 333.12, 521, 558, 678, 348/207.99, 371; 345/204, 619, 698; 713/322
See application file for complete search history.

(56) References Cited

U.S. PATENT DOCUMENTS

| | | | |
|---|---|---|---|
| 4,367,487 A | 1/1983 | Klein et al. | |
| 4,525,859 A | 6/1985 | Bowles et al. | |
| 4,931,785 A | 6/1990 | Ishii | |
| 5,327,175 A | 7/1994 | Kim | |
| 5,508,721 A | 4/1996 | Hattori | |
| 5,608,461 A | 3/1997 | Sadowski et al. | |
| 6,130,721 A * | 10/2000 | Yoo et al. | 348/558 |
| 6,285,399 B1 | 9/2001 | Tao | |
| 6,297,850 B1 * | 10/2001 | Han et al. | 348/521 |
| 6,577,322 B1 * | 6/2003 | Fukuda | 345/698 |
| 6,600,492 B1 | 7/2003 | Shimomura et al. | |
| 6,708,234 B2 | 3/2004 | Moteki et al. | |
| 6,750,909 B1 | 6/2004 | Tsai | |
| 2002/0030751 A1 | 3/2002 | Takane | |
| 2002/0145597 A1 * | 10/2002 | Kim | 345/204 |
| 2002/0171772 A1 * | 11/2002 | Funke | 348/678 |
| 2003/0156201 A1 | 8/2003 | Zhang | |
| 2004/0012612 A1 * | 1/2004 | Chan et al. | 345/619 |
| 2006/0136764 A1 * | 6/2006 | Munguia | 713/322 |

OTHER PUBLICATIONS

"Interrupts vs. Polling", internet web page captured from http://www.cab.u-szeged.hu/linux/doc/khg/node19.html, dated 1996.*

* cited by examiner

*Primary Examiner*—Tuan V Ho
*Assistant Examiner*—Dennis Hogue
(74) *Attorney, Agent, or Firm*—Mark P. Watson

(57) ABSTRACT

A method and apparatus for determining the status of frame data transmission from an imaging device. According to one aspect of the invention, a graphics controller interfaces with a host and an imaging device, preferably a camera. A count value is specified, preferably by the host. Frame data received from the imaging device are counted to determine an actual count. A comparison is made between the actual count and the count value. Preferably, responsive to the comparison, an indication signal is generated for interrupting the host.

9 Claims, 3 Drawing Sheets

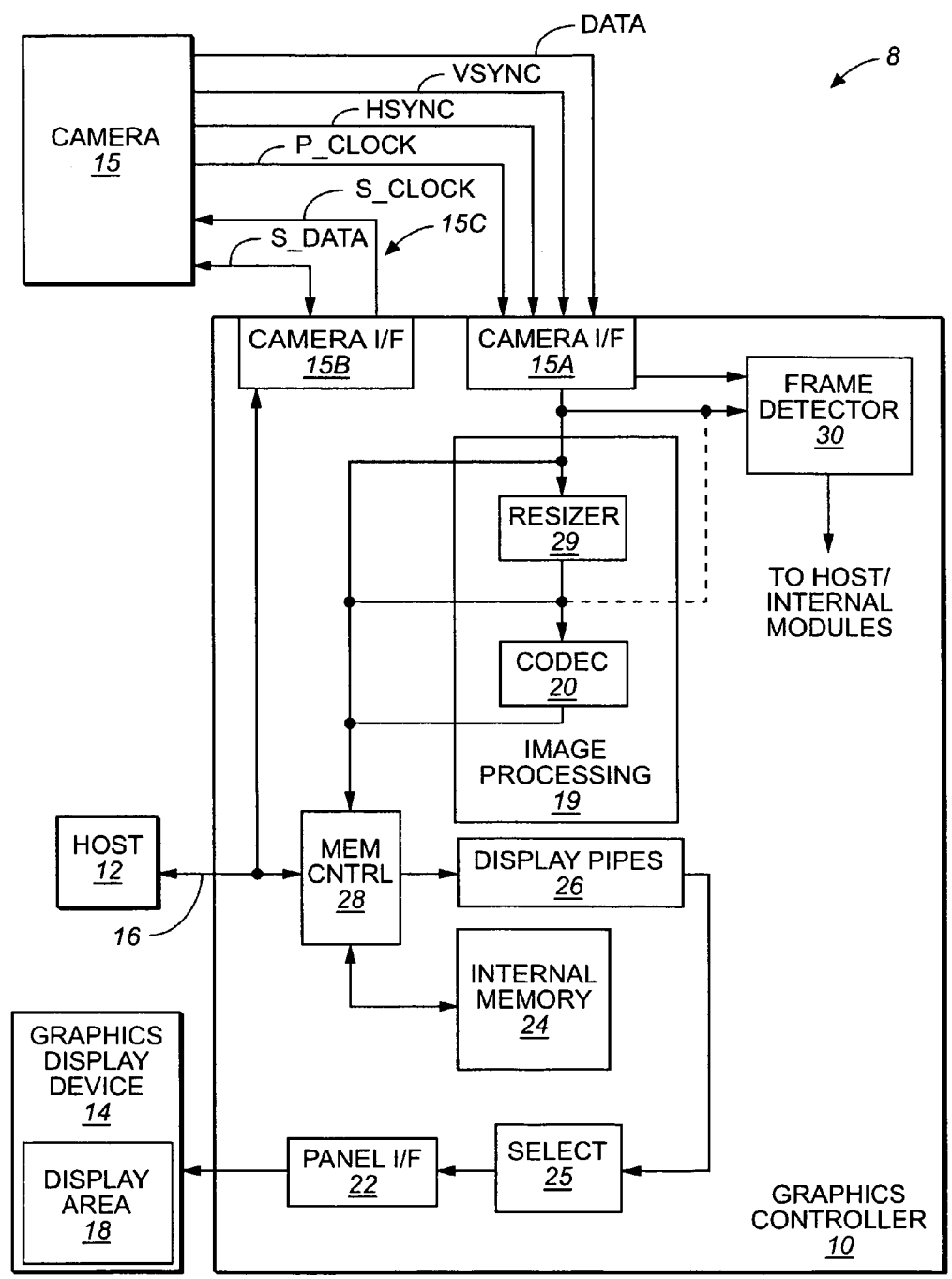
FIG._1

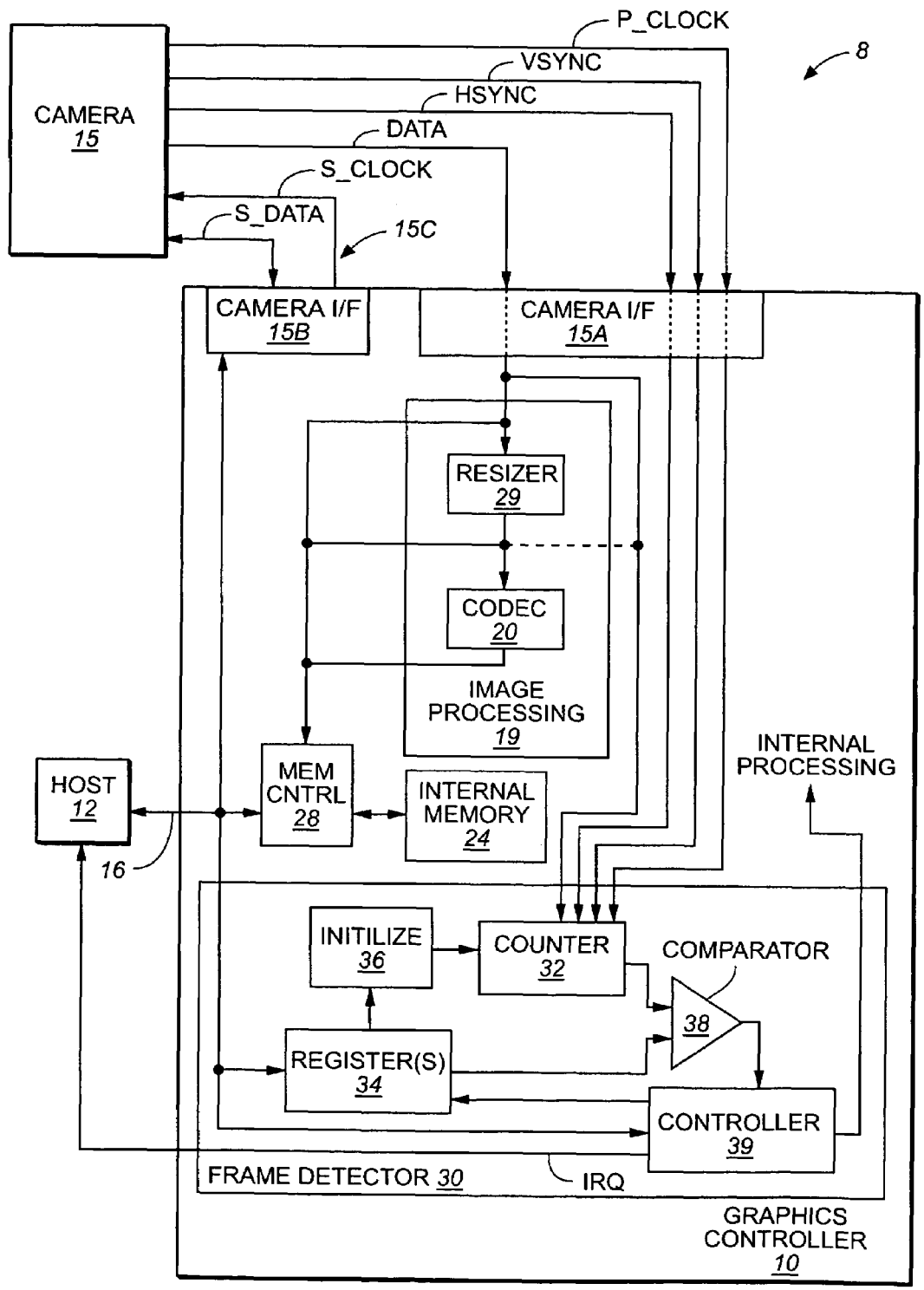
FIG._2

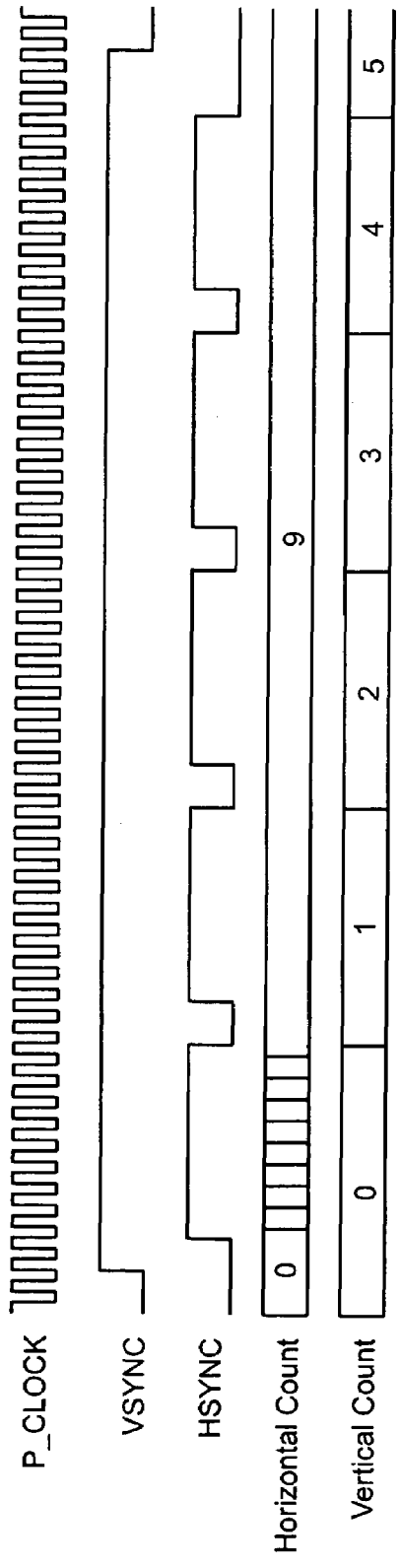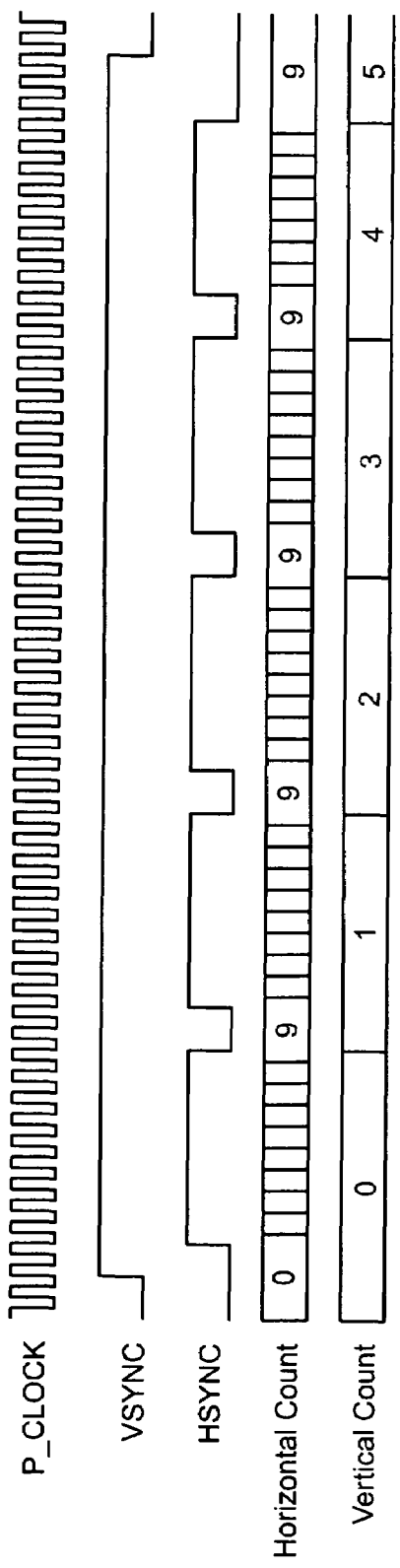

METHOD AND APPARATUS FOR DETERMINING THE STATUS OF FRAME DATA TRANSMISSION FROM AN IMAGING DEVICE

FIELD OF THE INVENTION

The present invention relates to a method and apparatus for determining the status of frame data transmission from an imaging device such as a camera. More particularly, the invention relates to providing such functionality in a graphics controller receiving the transmitted data for increasing the efficiency of processing the data in the graphics controller.

BACKGROUND

Graphics display systems, such as cellular telephones, typically employ a graphics controller as an interface between one or more sources of image data and a graphics display device such as an LCD panel or panels. In a cellular telephone, the sources of image data are typically a host, such as a CPU, and a camera. The host and camera transmit image data to the graphics controller for ultimate display. The host also transmits control data to both the graphics controller and the camera to control the operation of these devices.

The graphics controller provides various processing options for processing image data. For example, the graphics controller may compress or decompress, e.g., JPEG encode or decode, incoming or outgoing image data, crop the image data, resize the image data, scale the image data, and color convert the image data according to one of a number of alternative color conversion schemes. All these image processing functions provided by the graphics controller are responsive to and may be directed by control data provided by the host.

The host also transmits control data for controlling the camera to the graphics controller, and the graphics controller, in response, programming the camera to send one or more frames of image data acquired by the camera to the graphics controller. For example, the camera is typically capable of transmitting image data for displaying a stream of 'preview' images as well as a stream of full frames of image data for full frame image display. A 'preview' image is of relatively low resolution, e.g., 160×120 or 320×240, whereas a full frame is of much higher resolution. The 'preview' image, being smaller, requires the transfer of less data, which is useful for conserving power.

Accordingly, after displaying images in a "preview" mode, a user may select a "full frame" mode through the use of control data transmitted to the camera by the host. The use of "preview" and "full frame" modes may correspond, respectively, to finding a desired image through a viewfinder of a manually operated camera and snapping a picture.

Image data provided by the camera are typically streamed from the camera in raster scan order, and the camera also provides the graphics controller with synchronizing signals VSYNC and HSYNC that indicate the start of a frame and the start of a row within the frame, respectively. These signals are not available to the host, however. Particularly, the host has no indication whether and when the camera has in fact changed from "preview" to "full frame" mode (or the reverse) or the progress of the transmission of a given frame, i.e., how much of the frame has been transmitted.

As a result of this lack of status information, controlling the desired image processing operations in the graphics controller can be inefficient. For example, it is typically desired to JPEG encode the full frame image obtained in "full frame" mode but not to JPEG encode the image data obtained in "preview" mode. This processing can be commenced prior to the transmission of a complete, full frame. More particularly, this processing can be commenced when a minimum number of pixels, such as an 8×8 block, have been received. However, without knowing the status of frame transmission, the host must wait to commence encoding, and more specifically to signal the graphics controller to commence encoding, until some time after a complete frame has been transmitted. Further, since the host does not know when the camera has begun to transmit a frame, the host must wait a longer time to account for a presumed "worst-case" length of time that the camera may require for transmitting the frame. Still further, the camera typically does not provide an indication that it has changed transmit mode, e.g., from "preview" to "full frame." Therefore, the host must wait an even longer time to account for the camera's delay. Yet further, this delay is specific to the particular camera so that a "worst-case" camera delay must also be presumed to ensure proper functioning with any camera.

The same problems may exist for timing other types of processing operations. Therefore, it is a general problem in the art that the host cannot control the graphics controller as efficiently as would be desirable to process frames of image data received from a device such as a camera that is subject only to open loop control. Thence, there is a need for a method and apparatus for determining the status of frame data transmission from such an imaging device.

SUMMARY

A method and apparatus for determining the status of frame data transmission from an imaging device is disclosed. According to one aspect of the invention, a graphics controller interfaces with a host and an imaging device, preferably a camera. A count value is specified, preferably by the host. Frame data received from the imaging device are counted to determine an actual count. A comparison is made between the actual count and the count value. Preferably, responsive to the comparison, an indication signal is generated for interrupting the host.

According to another aspect of the invention, the status of frame data transmission is determined where the data correspond to at least three sequentially transmitted frames at least two of which have different sizes. A first of the frames is received, and a second of the frames is subsequently received. Frame data of the received, first frame are counted to produce a first count for determining the size of the first frame, and frame data of the received, second frame are counted to produce a second count for determining the size of the second frame. If the determined size of the second frame is substantially different than the determined size of the first frame and a third of the frames is subsequently received, frame data of the received third frame are counted until reaching said second count and, as a result thereof, an indication signal is generated.

In timed relation to the indication signal, either the host or the graphics controller, or both, may take one or more time-sensitive actions.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 1 is a block diagram of a graphics display system according to the present invention comprising a host, a graphics controller according to the present invention, a graphics display device, and a camera.

FIG. 2 is a block diagram of the graphics controller of FIG. 1, showing a frame detector according to the present invention.

FIG. 3A is a timing diagram for determining frame transmission status according to the present invention.

FIG. 3B is a timing diagram for alternatively determining frame transmission status according to the present invention.

DETAILED DESCRIPTION OF PREFERRED EMBODIMENTS

The invention relates to a method and apparatus for determining the status of frame data transmission from an imaging device such as a camera. Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a system 8 including a graphics controller 10 according to the invention. The system 8 may be any digital system or appliance providing graphics output, but the graphics controller 10 is particularly advantageous for use in a portable appliance that is powered by a battery (not shown), where reduced power consumption is particularly important. The preferred system 8 is a cellular or mobile telephone. In an alternative preferred embodiment, the system 8 is a personal digital assistant.

The system 8 includes a standard host 12 and graphics display device 14. The graphics controller 10 interfaces between the host and the display device. The graphics controller is typically and preferably a single IC separate (or remote) from the host and separate from the display device.

The graphics display device 14 is adapted for displaying pixels of image data on a display area 18 of the device. LCDs are typically used as display devices in mobile telephones, but any device(s) capable of rendering pixel data in visually perceivable form may be employed. Image data originating from the host 12 are processed by, and transmitted to the display device 14 through, the graphics controller 10. Where image data are associated with a frame, they may be referred to herein as "frame data."

The host 12 is preferably a microprocessor, but may be a digital signal processor, computer, or any other type of controlling device adapted for controlling digital circuits. The host communicates with the graphics controller 10 over a bus 16.

The system 8 also includes a camera module 15 that acquires image data and provides the image data to the graphics controller 10 in addition to any image data provided by the host. The graphics controller provides two interfaces for interfacing with the camera 15: a parallel, image data interface 15a, and a serial, control interface 15b. The interface 15a provides for transmitting image data ("DATA") along with a clock signal ("P_Clock"), and vertical and horizontal synchronizing signals ("VSYNC" and "HSYNC"). The clock signal is used by the interface 15a, e.g., to determine when DATA are validly asserted.

The serial interface 15b provides for transmitting control information ("S_Data") to and from the camera 15 and transmitting a clock signal ("S_Clock") to the camera 15. The bus 15c corresponding to the interface 15b is preferably that known in the art as the "Inter Integrated Circuit" ($I^2C$).

The graphics controller 10 includes an internal memory 24 controlled by a memory controller 28. Data stored in the internal memory may be provided by the host 12 as well as the camera 15. Typically, data provided by the host are associated with a "main window" displayed on the graphics display device and data provided by the camera are associated with a "sub-window" display, where the sub-window overlies the main window and is often mobile.

Typically, a number of image processing operations are performed on data provided by the camera 15. Such image processing operations as discussed above are performed by a module or circuit generally indicated as 19 in FIG. 1. The image processing block 19 includes, for particular illustration, a CODEC 20 for compressing and decompressing image data, and a resizer 29 for scaling and cropping the data. It should be understood for present purposes that, in general, selected image processing operations may be performed in any combination and in any order, and image data may be tapped for status determination by the present invention as discussed below at any point within the block 19.

Data stored in the internal memory 24 are fetched from the memory and transmitted to the graphics display device 14 under control of the memory controller 28. Typically, the data are transmitted through a plurality of parallel "display pipes" 26, which are preferably FIFO buffers, through a selecting circuit 25, for selecting data from one of the pipes 26, before being transmitted through a panel interface 22 ("Panel I/F") for interfacing with the graphics display device 14.

Except for a frame detector 30 described below, the general architecture described above is conventional. FIG. 2 shows the graphics controller 10 with detail illustrating novel features according to the invention. Particularly, the graphics controller 10 includes the frame detector 30 adapted to provide frame transmission status information as well as take action based on the information.

Referring to FIG. 2, a preferred frame detector 30 includes a counter 32, one or more registers 34, a count initialize circuit 36, a comparator 38, and a controller 39. The count initialize circuit 36 recognizes the start of a frame provided by the camera 15 by use of the VSYNC pulses provided by the camera 15, and resets the counter 32 to initialize the counter. Alternatively, the host 12 may write a bit to one of the registers 34 to instruct the counter 32 to start counting. The host may write to the registers 34 through the controller 39 or directly as desired.

The counter then counts the frame data, or a proxy for the frame data, received from the camera. In addition, the counter may count resized frame data, such as the frame data in a cropped or scaled image, as shown by dashed lines 42. Each count is compared to a specified value in one of the registers 34. The value is preferably specified by the host 12 writing the value to the register. Alternatively, the host could select one of a set of predetermined choices for the value provided by the graphics controller.

When the count reaches the specified value, the comparator 38 signals the controller 39 which may take a number of different actions in response, either to commence, or cause the commencement of particular operations. For this purpose, the controller may produce an interrupt signal ("IRQ") for interrupting the host 12 and thereby informing the host of the status of the frame data, so that the host may instruct the graphics controller or instruct other processes. Alternatively, the controller may set a bit in one of the registers 34 that the host 12 periodically polls to achieve the same result, though less efficiently. On the other hand, the controller may direct the graphics controller to carry out internal processing operations, such as JPEG encoding/decoding, where the host merely specifies that such processing is to occur and does not specify the timing therefore.

Referring to FIG. 3A, the frame counter 30 may ascertain the start and duration of a frame by noting the time of commencement and the duration of assertion by the camera of a vertical synchronization signal ("VSYNC") available to the graphics controller 10. Within this period, a horizontal synchronization signal ("HSYNC") is asserted and de-asserted corresponding to each row within the frame. FIG. 3A shows five HSYNC periods, corresponding to five rows.

The counter 32 is preferably initialized upon the first assertion of HSYNC after the assertion of VSYNC, corresponding to the first frame data for the frame. Thereafter, the counter 32 counts camera clock cycles of "P_Clock" until the HSYNC signal is de-asserted. The number of counts ("Horizontal Count") so obtained determines the number of pixels in a row. In many cases, it can be assumed that the number of pixels is the same for each row. Accordingly, a total count can be obtained by counting the number of times HSYNC is asserted ("Vertical Count") multiplied by Horizontal Count as determined for the first row. Where the number of pixels is not the same for each row, as shown in FIG. 3B, the counter 32 may continue to count the Horizontal Count through each row.

As mentioned above, the camera typically provides no indication that it has switched from one image resolution mode to another. Preferably then, the frame detector continuously counts the data in each frame and determines a change in resolution mode whenever a current frame includes either a substantially increased or a substantially decreased quantity of data as compared to the preceding frame. For example, where the amount of frame data in a frame increases from one sequence of frames to another, it can generally be assumed that the mode has changed from "preview" to "full frame" mode. As will be readily appreciated, this strategy can easily be modified to subject the conclusion of a mode change to verification by considering the counts in additional preceding frames and in one or more subsequent frames as confirmation of an assumed mode change.

The count provides a real-time determination of the amount of frame data received from the camera. Within a frame, where the total expected amount of frame data has been determined as discussed immediately above, the fractional amount of frame data can also be determined.

The status of frame data transmission from the camera 15 may be used for any desired purpose and is particularly useful for triggering processing or other time-sensitive or time-advantageous operations, messages or outputs, in timed relation to either the receipt of a frame of a given mode or the receipt of a given amount of data within a frame.

A preferred use for status information indicating the fractional amount of a frame that has been transmitted is triggering an image processing operation within the graphics controller, such as compression encoding or decoding which does not, generally, require a full frame of data for commencement.

A preferred use for status information indicating a change of mode is triggering an operation external to the graphics controller, such as producing a flash for illuminating the subject of the camera. The flash is desirable only in "full frame" mode where an image is to be acquired and can be timed using frame status information in relation to a VSYNC signal for what is determined according to the invention to be a full frame. The frame for which the flash is produced may be any frame after a change from "preview" mode has been detected.

While, typically, the clock signal from the camera 15 toggles at the rate that pixels are transmitted from the camera, a count may be specified to be any quantity of data less than or greater than a pixel and may, as a particular example, correspond to the number of pixels in a JPEG encoded block. The counter 32 may count the actual data instead of the proxy provided by the clock to provide fully equivalent results. As will be readily appreciated, the host is programmed to specify the count value as appropriate for comparison to the actual count determined in the frame detector 30 by taking account of the manner in which the actual count is determined.

The frame detector 30 provides the novel capability and outstanding advantage of determining the status of frame transmission from the camera and signaling processing when it is most efficient.

It is to be recognized that, while a particular method and apparatus for determining the status of frame data transmission from an imaging device has been shown and described as preferred, other configurations and methods could be utilized, in addition to those already mentioned, without departing from the principles of the invention.

It should be understood that, while preferably implemented in hardware, the frame detector 30 could be implemented in a combination of hardware and software, or be implemented in software, provided the graphics controller is suitably adapted. For example, a program of instructions stored in a machine readable medium may be provided for execution in a processing device included in the graphics controller.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. In a graphics controller for interfacing with a host and an imaging device, a method for detecting when a resolution of frames of image data transmitted from the imaging device changes, the method comprising:
   receiving a first frame of image data;
   subsequently receiving a second frame of image data;
   counting frame data of the first frame to produce a first count to determine the size of the first frame;
   counting frame data of the second frame to produce a second count to determine the size of the second frame, wherein, if the determined size of the second frame is substantially different than the determined size of the first frame, the method further comprises generating a first indication signal; and
   performing an operation external to the graphics controller in timed relation to the generation of said first indication signal; and
   wherein said external operation includes generating a flash for illuminating a subject for imaging by the imaging device.

2. The method of claim 1, further comprising generating said first indication signal only if the determined size of the second frame is substantially larger than the determined size of the first frame.

3. The method of claim 1, further comprising receiving a third frame of image data subsequent to receiving the second frame and counting frame data of the third frame to determine the size of the third frame, and if the determined size of the third frame is substantially the same as the determined size of the second frame, generating a second indication signal.

4. The method of claim 1, further comprising receiving a third frame of image data subsequent to receiving the second frame and performing an image processing operation in the graphics controller on the frame data of said third frame.

5. The method of claim 4, wherein said image processing operation includes one of (a) compression encoding and (b) compression decoding said frame data of said third frame.

6. The method of claim 3, further comprising generating a flash in timed relation to the generation of said second indication signal for illuminating a subject for imaging by the imaging device.

7. The method of claim 1, further comprising causing a host interrupt request to be generated in response to said first indication signal.

8. In a graphics controller for interfacing with a host and an imaging device, a frame detector for detecting when a resolution of frames of image data transmitted from the imaging device changes, comprising:

a counter;

a controller to cause said counter to count frame data of a received, first frame to produce a first count, and to determine the size of the first frame from said first count, to cause said counter to count frame data of a received, second frame to produce a second count, and to determine the size of the second frame from said second count, and if the determined size of the second frame is substantially different than the determined size of the first frame to generate an indication signal; and a unit to generate a flash in timed relation to the generation of said indication signal, said flash for illuminating a subject.

9. The frame detector of claim 8, further comprising means for causing a host interrupt request to be generated in response to said indication signal, wherein the host, in response to said interrupt request, directs the graphics controller to perform an image processing operation on frame data.

* * * * *